Aug. 21, 1956   G. L. CLAYBOURN   2,760,020
METAL-CLAD SWITCHGEAR
Filed Jan. 14, 1953   2 Sheets-Sheet 2
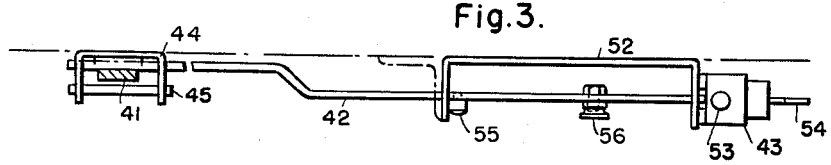
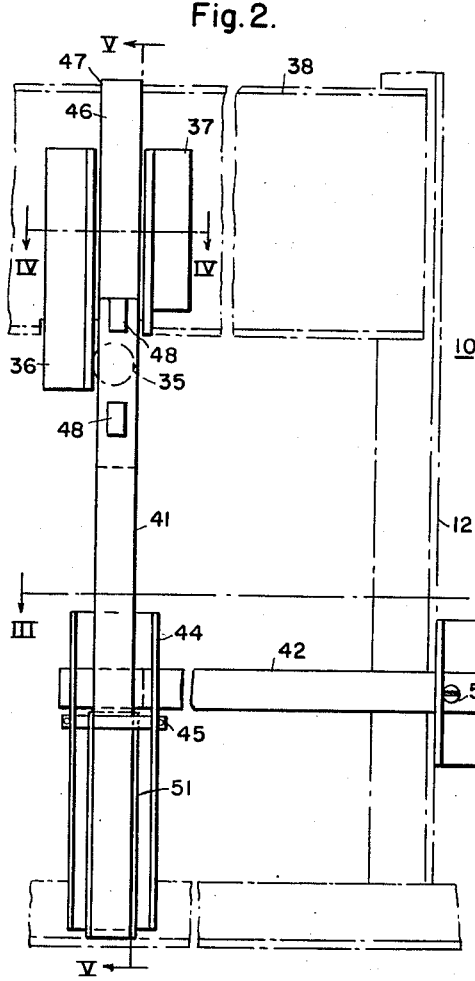
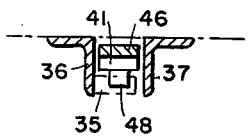
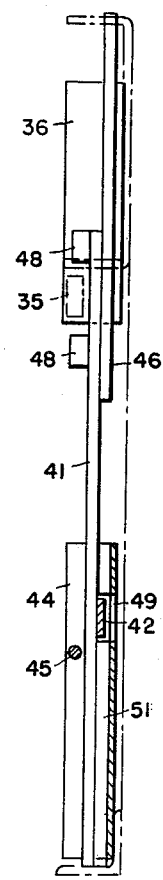
WITNESSES:
INVENTOR
Glen L. Claybourn.
BY
ATTORNEY United States Patent Office 2,760,020

Patented Aug. 21, 1956

2,760,020

METAL-CLAD SWITCHGEAR

Glen L. Claybourn, Pittsburgh, Pa., assignor to Westinghouse Electric Corporation, East Pittsburgh, Pa., a corporation of Pennsylvania Application January 14, 1953, Serial No. 331,265

7 Claims. (Cl. 200—50)

My invention relates, generally, to metal-clad switchgear and, more particularly, to interlocking mechanisms for metal-clad switchgear having removable circuit breaker units.

It is frequently desirable to so interlock a removable circuit breaker unit with another piece of apparatus, for example, a disconnecting switch, that the operation of the two devices must be properly correlated in order to prevent injury to the apparatus and/or operating personnel.

An object of my invention, generally stated, is to provide an interlocking mechanism for metal-clad switchgear which shall be simple and efficient in operation and which may be economically manufactured and installed.

A more specific object of my invention is to provide an interlock of the key-controlled type for a metal-clad switchgear circuit breaker unit.

A further object of my invention is to provide an interlocking mechanism for controlling the movement of a circuit breaker unit between connected and test positions in a switchgear cell or housing.

Another object of my invention is to provide a manually operable mechanical interlocking mechanism for directly controlling the operation of the levering device for a metal-clad switchgear unit.

A still further object of my invention is to provide an interlocking mechanism for a horizontal drawout breaker unit which shall permit the breaker unit to rest in the normal disconnected position in the cell when the interlocking mechanism is functioning.

Other objects of my invention will be explained fully hereinafter or will be apparent to those skilled in the art.

In accordance with one embodiment of my invention, the operation of the levering device for moving a circuit breaker unit between connected and test positions in a switchgear cell is directly controlled by a manually operable interlocking mechanism which, in turn, is so controlled by a key-operated lock that the operation of the circuit breaker unit is properly correlated with associated apparatus.

For a better understanding of the nature and objects of the invention, reference may be had to the following detailed description, taken in conjunction with the accompanying drawings, in which:

Fig. 2 is an enlarged view, in side elevation, of the interlocking mechanism utilized in the structure shown in Fig. 1;

Fig. 3 is an enlarged view, partly in section and partly in plan, of the interlocking mechanism, the section being taken along line III—III in Fig. 2;

Fig. 4 is an enlarged view, in section, taken along the line IV—IV in Fig. 2, and Fig. 5 is an enlarged view, in section, taken along the line V—V in Fig. 2.

Figure 1:
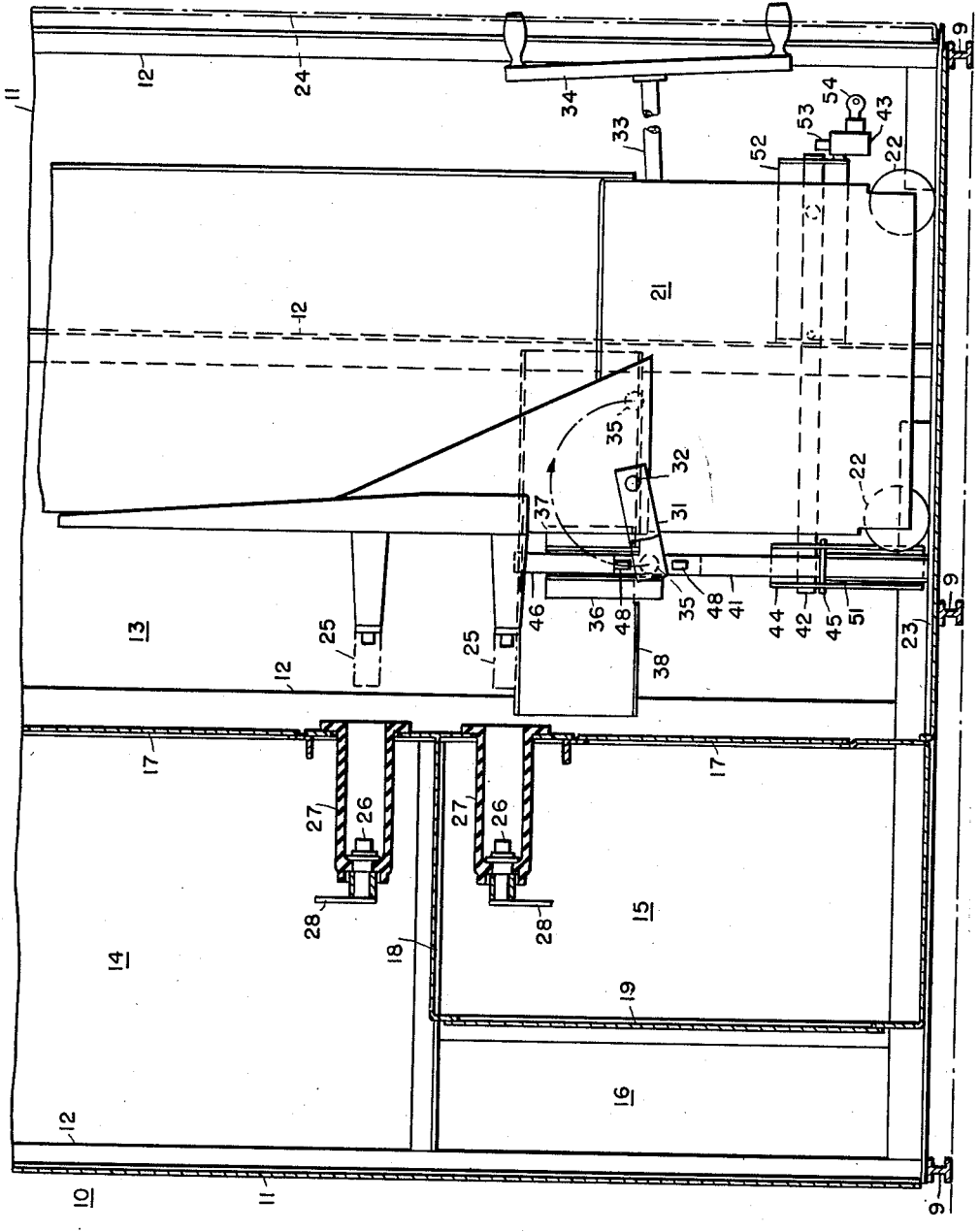
Figure 1 is a view, partly in side elevation and partly in section, of a portion of a metal-clad switchgear structure embodying the principal features of the invention.

Referring to the drawings, and particularly to Fig. 1, the structure shown therein comprises a portion of a metal-clad switchgear cell or housing 10 which may be constructed by securing sheet metal members 11 to angle frame members 12 in a manner well known in the art. The cell structure may rest upon beams 9 disposed upon a suitable foundation. The cell 10 comprises a circuit breaker compartment 13, a current transformer compartment 14, a bus compartment 15 and an outgoing cable compartment 16. The various compartments are separated by partition members 17, 18 and 19.

A circuit breaker unit 21 is disposed in the breaker compartment 13 and may be moved horizontally into and out of the cell on wheels 22 which run on rails 23 disposed at the bottom of the cell. A hinged door 24 is provided at the front of the cell to permit the breaker unit to be withdrawn from the cell. In accordance with the usual practice, the breaker unit is provided with primary disconnecting contact members 25 which are disposed to engage stationary contact members 26 which are mounted inside insulating sleeves 27 disposed inside the cell 10. The disconnecting contact members may be of the type described in Patent No. 2,376,818, issued May 22, 1945, to M. J. Rubel and assigned to the Westinghouse Electric Corporation.

In accordance with the usual practice, a levering device is provided for mechanically moving the circuit breaker unit 21 between the operating or connected position and the test or disconnected position within the cell 10. In the present drawing, the circuit breaker unit is shown in the test or disconnected position. When the breaker unit is inserted to the connected or operating position, the disconnecting contact members 25 engage the stationary contact members 26, thereby connecting the circuit breaker to power conductors 28 which are connected to the stationary contact members 26.

In the present instance, the levering device comprises a pair of lever arms 31 which are secured to a horizontal shaft 32 rotatably mounted in the circuit breaker unit. The shaft 32 is driven by a shaft 33 through a worm gear (not shown). The shaft 33 may be manually rotated by means of a removable hand crank 34. A roller 35 is provided at the end of each one of the lever arms 31 and is disposed in a slot provided between angle members 36 and 37 which are secured to a channel member 38 which, in turn, is secured to angle frame members 12 at the side of the cell structure. Since a lever arm 31 and the cooperating angle members 36 and 37 are provided at opposite sides of the breaker unit, a levering force is applied at both sides of the breaker unit.

It will be seen that when the shaft 32 is rotated to drive the arms 31 in a direction indicated by the arrow, the rollers 35 move in the slots between the members 36 and 37, which, as previously explained, are secured to the side of the cell structure, thereby drawing the circuit breaker unit into the cell to the connected position. When the shaft 32 is rotated in the opposite direction, force is applied through the arms 31 to move the breaker unit from the connected to the disconnected position shown in the drawings. As indicated by the broken lines, each roller 35 moves through an angle slightly over 180° during the movement of the breaker unit from the test to the connected position.

As explained hereinbefore, it is frequently desirable to so interlock the circuit breaker unit with apparatus located remotely from the breaker unit that the operation of the breaker unit and the other apparatus is properly correlated to protect the other apparatus. Thus, it may be desirable to so interlock a breaker unit with a disconnecting switch that the breaker unit cannot be moved from the disconnected or test position to the connected or operating position in the cell until after the disconnecting switch has been closed.

Accordingly, I have provided an interlocking mechanism for controlling the operation of the levering device for moving the circuit breaker between the connected and disconnected positions in the cell. As shown more clearly in Figs. 2 to 5 inclusive, the interlocking mechanism comprises an interlocking or follow bar 41, a locking bar 42, and a key-operated lock 43. The interlocking bar 41 is vertically disposed at one side of the cell 10 between the angle members 36 and 37. The lower end of the bar 41 is disposed between the sides of a channel member 44 which may be secured to the side of the cell 10. The bar is retained in the channel member 44 by a removable pin 45. An extension 46 is provided on the upper end of the bar 41 and moves through an opening 47 in the flange of the channel member 38. Spaced blocks 48 are secured to the bar 41 at opposite sides of the roller 35. Thus, the roller 35 cannot move upwardly between the guide members 36 and 37 unless the bar 41 is permitted to follow the movement of the roller 35.

Upward movement of the bar 41 is prevented by the locking bar 42, the inner end of which extends through notches 49 provided in the channel member 44. A plate 51 is secured to one side of the bar 41 at its lower end and is so disposed below the bar 42 that the bar 41 cannot move upwardly until the bar 42 is withdrawn to clear the plate 51.

The bar 42 is supported by a bracket 52 which may be secured to one of the angle members 12 of the cell structure. The bracket 52 is provided with spaced arms having openings therein through which the bar 42 moves horizontally. The travel of the bar 42 is limited by stops 55 and 56 which engage the arms of the bracket 52.

As shown most clearly in Fig. 2, a bolt 53 which is operated by the lock 43 extends above the outer end of the bar 42, thereby preventing the bar from being moved outwardly to permit the bar 41 to move vertically. The bolt 53 can be withdrawn into the lock 43 by means of a key 54 to permit the bar 42 to be moved outwardly. The key 54 may be the same one which controls the operation of another piece of apparatus, such as a disconnecting switch, which is provided with a lock similar to the lock 43. Thus, the key 54 cannot be obtained from the locking mechanism for the disconnecting switch until the proper operation of the switch has been completed. Therefore, the breaker unit cannot be moved into the cell by means of the levering device until after the proper operation of the disconnecting switch or other apparatus has been completed. In this manner, the operation of the circuit breaker unit and the other apparatus is properly correlated. It will be seen that the present interlocking mechanism functions independently of the status of the main contact members of the circuit breaker, the operation of which may be interlocked with the levering device by other means well known in the art.

It will be understood that the present interlocking mechanism may be readily constructed to control movement of the circuit breaker unit from the connected to the disconnected position as well as from the disconnected to the connected position.

It will also be understood that an interlocking mechanism embodying some of the features of the present invention may be utilized to control the movement of a circuit breaker of the vertical lift type in a manner similar to that herein described, but other features of the invention are particularly directed to an interlocking mechanism for a horizontal drawout breaker.

From the foregoing description it is apparent that I have provided a manually operable mechanical interlocking mechanism for directly controlling the operation of a levering device for moving a circuit breaker unit between test and operating positions in a switchgear cell. The interlocking mechanism is positive in operation since it directly controls the operation of the levering device. The breaker unit is permitted to rest in its normal disconnected position in the cell when the interlock is functioning, thereby precluding the possibility of the breaker unit being jarred out of the cell onto the floor or foundation. Furthermore, the interlocking mechanism is simple in construction and may be readily installed in a metal-clad switchgear unit.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a switchgear structure, in combination, a cell, a circuit breaker unit having openable and closable contact members disposed in the cell, a levering device carried by the breaker unit and having a disengageable connection between the breaker unit and the cell for moving the breaker unit between connected and test positions in the cell, and a mechanical interlocking mechanism mounted in the cell and directly engaging the levering device to control the operation of said levering device independently of the status of the breaker contact members.

2. In a switchgear structure, in combination, a cell, a circuit breaker unit having openable and closable contact members disposed in the cell, a levering device carried by the breaker unit and having a disengageable connection between the breaker unit and the cell for moving the breaker unit between connected and test positions in the cell, and a key-controlled manually operable mechanical interlocking mechanism mounted in the cell and directly engaging the levering device inside the cell to control the operation of said device independently of the status of the breaker contact members.

3. In a switchgear structure, in combination, a cell, a circuit breaker unit disposed in the cell, mechanical means carried by the breaker unit and having a disengageable connection between the breaker unit and the cell for moving the breaker unit between connected and test positions in the cell, a manually operable interlocking mechanism disposed in the cell and having a portion movable with the mechanical means for controlling the operation of said mechanical means, and a key-operated lock mounted in the cell for controlling the operation of said interlocking mechanism.

4. In a switchgear structure, in combination, a cell, a circuit breaker unit disposed in the cell, a lever arm carried by the breaker unit and engaging the cell for moving the breaker unit between connected and test positions in the cell, mechanical means carried by the breaker unit for driving the lever arm, a manually operable interlocking mechanism disposed in the cell for engaging the lever arm to control the movement of said arm, and a key-operated lock mounted in the cell for controlling the operation of said interlocking mechanism.

5. In a switchgear structure, in combination, a cell, a circuit breaker unit disposed in the cell, a lever arm mounted on the breaker unit and engaging the cell for moving the breaker unit between connected and test positions in the cell, mechanical means carried by the breaker unit for driving the lever arm, an interlocking bar disposed in the cell for engaging said lever arm to control its operation, a manually operable locking bar disposed in the cell for controlling the movement of the interlocking bar, and a key-operated lock mounted in the cell for controlling the operation of said locking bar.

6. In a switchgear structure, in combination, a cell, a circuit breaker unit disposed in the cell, a lever arm mounted on the breaker unit and cooperating with means in the cell for moving the breaker unit between connected and test positions in the cell, mechanical means carried by the breaker unit for driving the lever arm, a vertically movable interlocking bar disposed in the cell for engaging said lever arm to control its operation, a horizontally movable locking bar disposed in the cell for controlling the movement of the interlocking bar, and a key-operated lock mounted in the cell for controlling the operation of said locking bar.

7. In a switchgear structure, in combination, a cell, a circuit breaker unit disposed in the cell, a lever arm mounted on the breaker unit and cooperating with means in the cell for moving the breaker unit between connected and test positions in the cell, mechanical means carried by the breaker unit for driving the lever arm, a vertically movable interlocking bar disposed in the cell and having spaced means thereon engaging said lever arm to control its operation, a horizontally movable locking bar disposed in the cell for engaging said interlocking bar to control its movement, and a key-operated lock mounted on the cell for controlling the horizontal movement of said locking bar.

References Cited in the file of this patent

UNITED STATES PATENTS

| | | |
|---|---|---|
| 1,729,864 | Brown | Oct. 1, 1929 |
| 2,364,465 | Myers | Dec. 5, 1944 |
| 2,443,664 | Rothfus | June 22, 1948 |
| 2,554,510 | Spicer | May 29, 1951 |
| 2,615,101 | Caswell | Oct. 21, 1952 |
| 2,617,862 | Caswell | Nov. 11, 1952 |